United States Patent Office 2,850,531
Patented Sept. 2, 1958

2,850,531
PROCESS FOR THE PREPARATION OF CYCLOHEXYLHYDROXYLAMINE

Arthur W. Weston, Waukegan Township, Lake County, James F. Jeffries, Waukegan, and Adolph O. Geiszler, Mundelein, Ill., assignors to Abbott Laboratories, North Chicago, Ill., a corporation of Illinois No Drawing. Application February 14, 1955
Serial No. 488,142

2 Claims. (Cl. 260—563)

This invention relates to a method for making N-cyclohexylhydroxylamine and for further converting said amine to cyclohexylsulfamic acid.

Cyclohexylsulfamic acid is an important chemical compound which is usually employed in the form of the sodium and calcium salts thereof which are known commercially as sodium cyclamate and calcium cyclamate (Sucaryl, Abbott Laboratories). These salts have achieved great commercial importance as non-caloric sweetening agents. Cyclohexylsulfamic acid is prepared commercially from cyclohexylamine according to the process disclosed in Audrieth U. S. Patent No. 2,275,125.

It is a principal object of this invention to provide a method for making cyclohexylsulfamic acid from nitrocyclohexane by way of cyclohexylhydroxylamine in a convenient and economic process.

In the accomplishment of the foregoing object and in accordance with the practice of this invention there is now provided a process of reducing one mol of nitrocyclohexane with at least 2 mols of zinc in a mildly acidic aqueous medium. Cyclohexylhydroxylamine is recovered from the reaction mixture as an insoluble residue and after filtering and washing, a solution thereof is gassed with sulfur dioxide to form cyclohexylsulfamic acid.

The reaction is carried out in the presence of zinc dust as the reducing catalyst and any other finely divided metallic zinc can be used with comparable results. The pH of the mildly acidic aqueous medium is maintained between about 4 and 7 by dissolving therein a water soluble salt of a strong acid and a weak base. Ammonium chloride, ammonium sulfate and amine salts of strong mineral acids such as aniline and pyridine hydrochloride or sulfate may be employed.

The temperature of the reaction is preferably controlled between about 0° C. and 50° C., although the temperature of the reaction is related inversely to the time and suitable conditions of time and temperature can be chosen to conform with the best commercial practice. Temperatures of about 40° C. have proven to be highly satisfactory in providing good yields in a short reaction time.

The following examples are presented in order to disclose the invention in full detail but these examples are not to be considered a limitation of the invention in any way.

*Example I*

50 grams of ammonium chloride is dissolved in water and 65 grams of nitrocyclohexane (.5 mol) is added. 65 grams of zinc dust (1 mol) is added portionwise with stirring over a period of time and with cooling so that the temperature of the bath is held at about 15° C. When all of the zinc is consumed the reaction mixture is filtered and the filter cake is extracted with alcohol. On evaporation of the alcohol, cyclohexylhydroxylamine is obtained having a melting point of 135° C. The cyclohexylhydroxylamine thus obtained is suspended in a small volume of water and sulfur dioxide gas is bubbled in. On evaporation crystals separate from the reaction mixture and are washed with acetone. The solid product remaining after drying is cyclohexylsulfamic acid which has a melting point of between 165° C. and 170° C.

*Example II*

18 grams of ammonium chloride is dissolved in about 100 ml. water and about 300 ml. dioxane. 25.8 grams of nitrocyclohexane (0.2 mol) is added to the mixture. 30 grams of zinc dust (0.46 mol) is added in small portions to the foregoing mixture after heating to 45° C. A temperature of about 50° C. is maintained by use of a water bath. The zinc is all added over a period of 10 minutes and the reaction mixture is stirred for another 50 minutes, by which time the temperature of the reaction mixture drops to 40° C. The mixture is then heated to boiling and filtered. The filtrate is cooled and the precipitated product (cyclohexylhydroxylamine) is recovered. The cooled filtrate is then used to wash the zinc oxide filter cake and the filtrate is further cooled to remove the remainder of the product therefrom. 25 grams of wet cyclohexylhydroxylamine is obtained. After drying, the amine is dispersed in 200 ml. of benzene and gassed with sulfur dioxide, maintaining the temperature below about 50° C. Gassing is continued for about 15 minutes and the mixture is then cooled and the cyclohexylsulfamic acid is separated from the filtrate. An overall yield of 80% of cyclohexylsulfamic acid is obtained.

*Example III*

10 grams of cyclohexylhydroxylamine is suspended in dry benzene and gassed with sulfur dioxide, cooling the reaction flask to maintain a temperature between about 55° C. and 60° C. Gassing is continued for 12 minutes and the mixture is cooled in an ice bath and the cyclohexylsulfamic acid filtered off. After drying in a vacuum oven a 98% yield of the acid is obtained having a melting point of 168° C.–171° C.

Dry benzene is used in the gassing procedure because the cyclohexylsulfamic acid is not very stable in water or alcohol. Other suitable inert liquids may be used provided they are unreactive with the reactants and the product and provided further that the cyclohexylsulfamic acid is essentially insoluble in said liquid. Toluene, cyclohexane, hexane and dioxane are other examples.

*Example IV*

Pyridine sulfate is dissolved in water and nitrocyclohexane is added in the same manner as disclosed in Examples I and II. Zinc dust is added in the manner indicated in the foregoing examples and cyclohexylhydroxylamine is obtained.

Others may practice this invention in any of the numerous ways which will be suggested to one skilled in the art upon a reading of this disclosure. All such practice of the invention is considered to be covered hereby provided it falls within the scope of the appended claims.

We claim:

1. The process of making cyclohexylhydroxylamine which comprises reducing one mol of nitrocyclohexane with at least about two mols of zinc in a mildly acidic aqueous solution between pH about 4 and 7, of a salt of a strong mineral acid and a weak base at a temperature between about 0° C. and 50° C. until all the zinc is consumed, and separating the cyclohexylhydroxylamine thus formed.

2. The process of making cyclohexylhydroxylamine which comprises reducing 1 mol of nitrocyclohexane with at least about 2 mols of zinc in a mildly acidic aqueous solution of ammonium chloride at a temperature between about 0° C. and 50° C. until all the zinc is consumed and recovering said amine.

References Cited in the file of this patent

UNITED STATES PATENTS

| | | |
|---|---|---|
| 2,310,038 | Rust | Feb. 2, 1943 |
| 2,423,180 | Doumani | July 1, 1947 |

OTHER REFERENCES

Audrieth, et. al.: Chem. Review, vol. 26, page 52.
Bloomfield: Jour. Chem. Soc. (London), 1944, page 123.
Sidgewick: Org. Chem. of Nitrogen (1937), page 162.
Degering: Org. Nitrogen Compound (1937), paragraph 1440.